United States Patent
Navratil et al.

(10) Patent No.: US 11,676,075 B2
(45) Date of Patent: Jun. 13, 2023

(54) LABEL REDUCTION IN MAINTAINING TEST SETS

(71) Applicant: International Business Machines Corporation, Armonk, NY (US)

(72) Inventors: Jiri Navratil, Cortlandt Manor, NY (US); Matthew Richard Arnold, Ridgefield Park, NY (US); Begum Taskazan, Medford, MA (US); Benjamin Tyler Elder, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 16/868,170

(22) Filed: May 6, 2020

(65) Prior Publication Data
US 2021/0350181 A1  Nov. 11, 2021

(51) Int. Cl.
*G06N 20/10* (2019.01)
*G06N 20/00* (2019.01)
(Continued)

(52) U.S. Cl.
CPC ........... *G06N 20/10* (2019.01); *G06F 18/217* (2023.01); *G06F 18/2155* (2023.01); *G06F 18/2185* (2023.01); *G06N 20/00* (2019.01)

(58) Field of Classification Search
CPC .... G06K 9/6259; G06K 9/623; G06K 9/6262; G06K 9/6264; G06N 20/00; G06N 20/10;
(Continued)

(56) References Cited

U.S. PATENT DOCUMENTS 9,699,049 B2    7/2017  Gupta et al.
10,235,623 B2 *  3/2019  Lin .................. G06N 20/10
(Continued)

FOREIGN PATENT DOCUMENTS

KR    20190094134 A    8/2019

OTHER PUBLICATIONS

Li et al., "Towards Making Unlabeled Data Never Hurt," IEEE Transactions on Pattern Analysis and Machine Intelligence, Jan. 2015, vol. 37, Issue 1, 14 pages, IEEE.
(Continued)

*Primary Examiner* — Manav Seth
(74) *Attorney, Agent, or Firm* — Nathan M. Rau

(57) ABSTRACT

A computer-implemented method, a computer program product, and a system for reducing labeled sample quantities required to update test sets. The computer-implemented method includes inputting a portion of unlabeled production data into a base model and generating labeled output relating to the unlabeled production data. The computer-implemented method also includes inputting the labeled output into a performance predictor. The performance predictor is a meta model of the base model that is trained with another portion of the unlabeled production data, a training set used to train the base model, and a test set portioned from the training set. The computer-implemented method further includes outputting, by the performance predictor, a performance metric relating to the labeled output produced by the trained base model. The performance metric can be any metric capable of measuring the output performance of the base model.

20 Claims, 8 Drawing Sheets

(51) Int. Cl.
G06F 18/214 (2023.01)
G06F 18/21 (2023.01)

(58) Field of Classification Search
CPC ........... G06V 30/19147; G06V 10/771; G06V 30/1912; G06V 20/41; G06V 20/70; G06V 30/424; G06V 10/776; G06V 10/778; G06V 30/1916; G06V 30/19167; G06V 30/302; G06V 10/7788; G06V 10/7753; G06F 18/217; G06F 18/2185; G06F 18/2113; G06F 18/2155
See application file for complete search history.

(56) References Cited

U.S. PATENT DOCUMENTS

| | | | |
|---|---|---|---|
| 2014/0247978 | A1 | 9/2014 | Devin et al. |
| 2017/0236032 | A1* | 8/2017 | Lin ...................... G06V 10/764 382/159 |
| 2020/0202210 | A1* | 6/2020 | Kushnir ................... G06N 3/08 |
| 2020/0380118 | A1* | 12/2020 | Miller ................... G06F 21/577 |
| 2021/0004700 | A1* | 1/2021 | Prabhu ................... G06N 20/20 |
| 2021/0035015 | A1* | 2/2021 | Edgar .................... G06N 20/00 |
| 2022/0261831 | A1* | 8/2022 | Bronicki .............. G06K 9/6227 |

OTHER PUBLICATIONS

Guan et al., "Improving Label Noise Filtering by Exploiting Unlabeled Data," IEEE Access, 2018, vol. 6, pp. 11154-11165, IEEE.

Chawla et al., "Learning From Labeled And Unlabeled Data: An Empirical Study Across Techniques And Domains," Journal of Artificial Intelligence Research, 23 (2005), pp. 331-366.

Li et al., "Boosting Operational DNN Testing Efficiency through Conditioning," ESEC/FSE 2019: Proceedings of the 2017 27th ACM Joint Meeting on European Software Engineering Conference and Symposium on the Foundations of Software Engineering, Aug. 2019, pp. 499-509.

Mell et al., "The NIST Definition of Cloud Computing", Recommendations of the National Institute of Standards and Technology, Special Publication 800-145, Sep. 2011, 7 pages.

* cited by examiner

LABEL REDUCTION IN MAINTAINING TEST SETS

BACKGROUND

The present disclosure relates to machine learning, and more specifically, to a testing formulation that reduces labeling efforts needed to maintain test sets.

Production traffic received by a machine learning model can change over time, resulting in a degradation of predictive performance by the machine learning model. This change in environment and production traffic is known as concept drift. Test sets can provide an evaluation of the machine learning model to monitor the predictive performance of a machine learning model. Typically, a test set follows the same probability distribution of a training dataset. If a model fits the training dataset, it will also fit the test set. However, if production traffic has drifted, the test set may not accurately test the performance of a model. As such, labeling a new test may be required to accurately test a model.

To obtain a new test set, unlabeled data can be annotated with new labels that reflect current production traffic. Depending on the resources available, organizations, or individuals, can rely on various sources to perform the annotation process. For example, annotations can be performed by undergraduate or graduate students, crowdsourcing services, or directly from user inputs, otherwise known as payload data.

SUMMARY

Embodiments of the present disclosure include a computer-implemented method for reducing labeled sample quantities required to update test sets. The computer-implemented method includes inputting a portion of unlabeled production data into a base model and generating labeled output relating to the unlabeled production data. The computer-implemented method also includes inputting the labeled output into a performance predictor. The performance predictor is a meta-model of the base model that is trained with another portion of the unlabeled production data, a training set used to train the base model, and a test set portioned from the training set. The computer-implemented method further includes outputting, by the performance predictor, a performance metric relating to the labeled output produced by the trained base model. The performance metric can be any metric capable of measuring the output performance of the base model.

Additional embodiments of the present disclosure include a computer program product for reducing labeled sample quantities required to update test sets, which can include a computer-readable storage medium having program instructions embodied therewith, the program instructions executable by a processor to cause the processor to perform a method. The method includes inputting a portion of unlabeled production data into a base model and generating labeled output relating to the unlabeled production data. The method also includes inputting the labeled output into a performance predictor. The performance predictor is a meta-model of the base model that is trained with another portion of the unlabeled production data, a training set used to train the base model, and a test set portioned from the training set. The method further includes outputting, by the performance predictor, a performance metric relating to the labeled output produced by the trained base model. The performance metric can be any metric capable of measuring the output performance of the base model.

Further embodiments are directed to a performance predictor system for reducing labeled sample quantities required to update test sets and configured to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
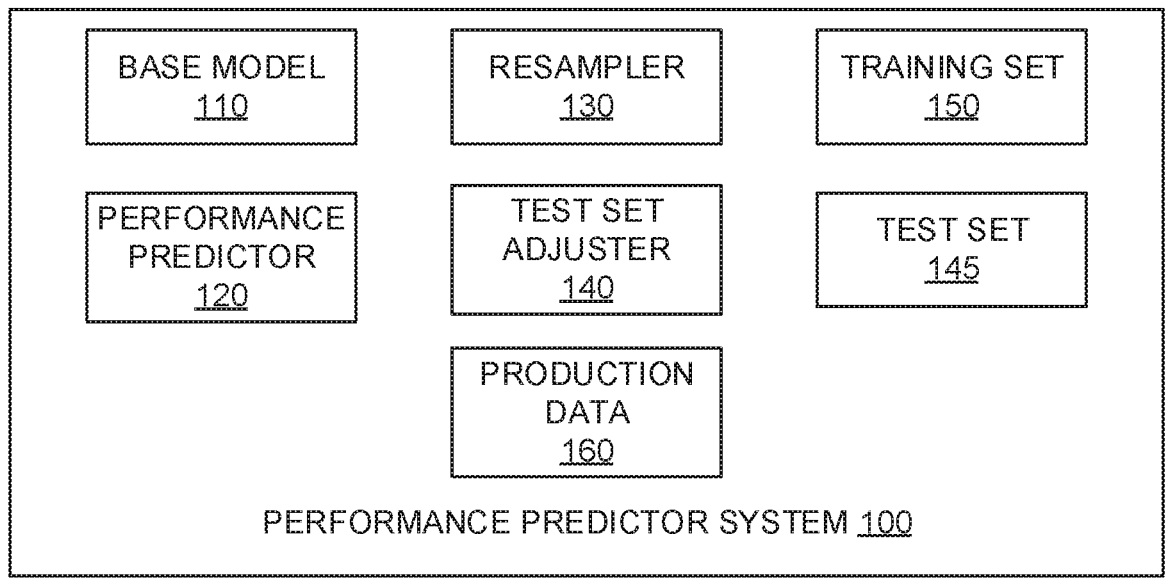
FIG. 1 is a block diagram illustrating a performance predictor system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to machine learning, and more specifically, to a testing formulation that reduces labeling efforts needed to maintain test sets. While the present disclosure is not necessarily limited to such applications, various aspects of the disclosure may be appreciated through a discussion of various examples using this context.

Developing a machine learning model requires several processes during the life cycle of the model. First, a problem and solution are defined that are solvable by a machine learning model. Next, raw input data is pre-processed and prepared, including feature engineering. During this process, a dataset is constructed where raw data is collected, features are identified within the dataset, and the data is split into a training set and a test set. Additionally, the data can also be analyzed and cleaned to ensure proper training of the machine learning model. After a dataset is prepared, the machine learning model and can be trained, evaluated, and prepared for production-readiness. Once a model is deployed into production, it is monitored, analyzed, and managed as part of a quality assurance process.

Collecting data used to train a model should be reliable, contain representative features, and minimize skew. To be reliable, the data should yield useful predictions and avoid labeling errors, noisy features, and be properly filtered for the problem that is to be solved. Representative features are features that might be useful in training a model.

After collecting and preparing a dataset, the dataset can be split into training sets, validation sets, and testing sets. Splitting the dataset can occur in various ways. For example, the dataset can be split randomly into different sets. For systems in production, training sets become older than production data, so the dataset can be split based on time. For example, production data is collected for thirty days and trained on data collected through the first twenty-nine days. The model can then be tested using the data collected on the last day.

Testing is a critical part of the quality assurance process for models used in real-world applications. Traditional testing takes a model and a test dataset as input and outputs quality metrics such as accuracy, precision, and recall. An assumption in such a process is that the test dataset is uniformly and randomly sampled from production traffic. If the assumption is violated, then the test dataset results can no longer be used as an indicator of how the model will perform in the production environment.

Production data can continually change over time. A test set that is representative one day may misrepresent production data the next day. This is typically referred to as concept drift. For instance, predictive modeling teaches a model from historical data and uses the model to make predictions on new data. The problem being solved can be viewed as approximating a mapping function for a given input to predict an output value. Typically, the mapping is assumed to be static, meaning that the mapping learned from the historical data is valid for future data where the relationships between the input and the output do not change. However, for many problems, the static assumption fails over time. For example, when the relationship between the input and output changes over time. In turn, there are changes to the underlying mapping function. As a consequence, predictions made by a model trained on older historical data may no longer be as accurate as more recent historical data. Techniques that continually refresh the test set by sampling new data from production data can attempt to mitigate concept drift. A more extensive approach can resample entirely new test sets regularly.

Limitations on testing efficiency remain, however, as labeling a dataset can be an expensive and laborious process. Typically, there is a strong desire to minimize the amount of labeling that occurs, and when labeling does occur, priority is often given to expanding model training data rather than test sets. As such, test sets can drift out of date, and the metrics they produce can have little relevance to what is being produced by the machine learning model.

Embodiments of the present disclosure may overcome the above and other problems by using a performance predictor system that produces a performance metric that allows for the reduction of the labeling effort required to maintain an accurate test set. The performance predictor system includes a base model that is a machine learning model configured to generate labeled outputs for samples within inputted production data. The performance predictor system also includes a performance predictor that is a meta-model of the base model. The performance predictor is configured to output binary outcomes for each labeled sample generated by the base model. A performance metric is computed by analyzing the binary outcomes for each sample in the labeled output. The performance metric can be a measure of performance for the output generated by the base model.

More specifically, the performance predictor system described herein provides a performance metric as a means of quality assurance for a trained base model using a performance predictor meta-model. For a given budget, the performance predictor system can add and remove labeled samples within a test set to maintain the test set and avoid drift. The performance predictor system can also employ resampling techniques and prioritization techniques to maintain a test set and accurately estimate a base model's performance.

By way of example, but not by limitation, the performance predictor system can seek to generate a performance metric using a given test set. The performance predictor system minimizes the difference between a ground truth performance metric and the performance metric generated by the performance predictor system. The following quantity can be represented and shown in Equation 1:

$$|\mathbb{E}[\widehat{Acc}(M|Y_S,X)] - |\mathbb{E}[Acc(M|Y_{all},X)]|  \qquad \text{Equation 1}$$

Where M represents a trained base model, a batch of N unlabeled data samples $X=\{x_1, \ldots, x_N\}$, at a constant labeling cost per individual data point. Given a budget to label up to $k<N$ point from X, let S, $|S|=k$, be an index subset identifying elements of X that have been labeled, with $Y_S$ being the set of the corresponding labels. A performance metric $\widehat{Acc}$ being estimated using labels $Y_S$ such that Equation 1 is minimized. Additionally, $Y_{all}$ denotes a set of labels for the entire dataset X, and $\mathbb{E}$ denotes an expectation. It should be noted that Acc(M) refers to the conventional accuracy calculation for a machine learning model M, $\widehat{Acc}(M)$ stands for any function generating an estimate of such a metric, which can include the output of predictive models.

The performance predictor system can utilize performance prediction, uncertainty prioritization, and resampling while maintaining a given budget for labeling on k samples. The performance predictor system can utilize these techniques to facilitate the minimization of the performance metric quantity demonstrated in Equation 1.

Embodiments of the disclosure also include a test set resampler that can apply sample selection bias correction techniques to the test set used by the performance predictor. A common source of discrepancy between unlabeled production data and a test set is a covariate shift. In the covariate shift, changes in the joint distribution of features and labels can be explained by changes in the features. To counter the covariate shift occurring between the unlabeled production data and the test set, sample selection bias correction techniques can be applied. Covariate shift also assumes that the probability of a particular instance selected in a sample depends on the feature and not the label as demonstrated in Equation 2:

$$Pr(s|X,Y)=Pr(s|x) \qquad \text{Equation 2}$$

Let s denote a random variable indicating a particular instance selected in a sample. Let X denote the features of the sample, and Y denote the label of the sample. The probability of s depending on feature X is equivalent to the probability of s depending on feature X and label Y. If the probability of s depends on the feature X or label Y, then the selection can be said to be biased. A weighting factor can be implemented during the selection process of a test set sample that can mitigate the bias of the selection.

Embodiments of the present disclosure further include a test set adjuster that can add and remove labeled samples within the test set. Testing a base model can be conducted continuously, and given a budget, labeled test sets can be generated and added to a test set that can be used to retrain the performance predictor meta-model which allows the performance predictor system to maintain a test set that is representative of the production data being processed by a base model. Additionally, the test set can adjust and remove samples from the test set that are no longer representative of the production data. These samples can be removed via a random selection or via a prioritization technique that analyzes an amount of uncertainty produced by the performance predictor for a given sample.

Referring now to FIG. 1, shown is a block diagram illustrating a performance predictor system 100, in accordance with embodiments of the present disclosure. The performance predictor system 100 includes a base model 110, a performance predictor 120, a test set resampler 130, a test set adjuster 140, a training set 150, a test set 155, and production data 160.

The base model 110 is a component of the performance predictor system 100 configured to assign labels to production data 160. For example, the base model 110 can perform predictive analysis, spam detection, pattern detection, image classification, as well as other types of categorical classifications. The base model 110 can employ different algorithmic methods to map and label the inputted data. For example, the base model 110 may be a perceptron, a Naïve Bayes, a decision tree, a logistic regression, a k-nearest neighbor, a neural network, a support vector machine, or any other type of algorithm capable of classification.

The base model 110 can employ various machine learning techniques in determining a labeled output for the inputted production data 160. Machine learning techniques can comprise algorithms or models that are generated by performing supervised, unsupervised, or semi-supervised training on a dataset, and subsequently applying the generated algorithm or model to generate a conditional probability that a consumer will take an action on an item. Machine learning algorithms can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage, and selection operator (LASSO), probabilistic classifier, factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), ensemble averaging, gradient boosted decision tree (GBRT), gradient boosting machine (GBM), inductive bias algorithms, inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the base model 110 provides a prediction probability for each label predicted. For example, if the base model 110 predicts an email as spam, that prediction is accompanied by a prediction probability, or confidence level, the base model 110 has in providing that prediction. The prediction probability can be a percentage range from 0 to 100%, depending on the confidence of the classifier. It should be noted that other forms of prediction probability can also show the confidence level of a predicted label by a given classifier. As the base model 110 is trained, its prediction probabilities can also increase with each training iteration. The base model 110 can go through training iterations until it reaches a prediction probability threshold that is satisfactory for the task given to the model.

In some embodiments, the base model is a recommendation engine configured to provide recommendations of items to consumers. A recommendation engine is a type of machine learning model configured to filter information to suggest items to consumers with a conditional probability that the consumer will take action on the item. To determine a suggested item, the recommendation engine can utilize various methods of recommendation. For example, the recommendation engine can employ methods such as collaborative filtering, content-based filtering, hybrid recommendation filtering, and the like.

The performance predictor 120 is a component of the performance predictor system 100 configured to provide binary outcomes for the output produced by the base model 110. For example, the base model 110 can perform predictive analysis, spam detection, pattern detection, image classification, as well other types of categorical classifications and the performance predictor 120 can provide a corresponding binary outcome indicating whether the base model 110 is correct or incorrect in its labeling. The performance predictor 120 can employ different algorithmic methods to map and label the inputted data. For example, the base model 110 may be a perceptron, a Naïve Bayes, a decision tree, a logistic regression, a k-nearest neighbor, a neural network, a support vector machine, or any other type of algorithm capable of classification.

The performance predictor 120 can employ various machine learning techniques in determining a binary outcome for the inputted labeled output produced by the base model 110. Machine learning techniques can comprise algorithms or models that are generated by performing supervised, unsupervised, or semi-supervised training on a dataset, and subsequently applying the generated algorithm or model to generate a conditional probability that a consumer will take an action on an item. Machine learning algorithms can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

In some embodiments, the performance predictor 120 provides a prediction probability for each label predicted. For example, if the performance predictor 120 predicts an output as correct, that prediction is accompanied by a prediction probability, or confidence level, the performance predictor 120 has in providing that prediction. The prediction probability can be a percentage range from 0 to 100%, depending on the confidence of the classifier. It should be noted that other forms of prediction probability can also show the confidence level of a predicted label by a given classifier.

The resampler 130 is a component of the performance predictor system 100 configured to resample the test set 145, in accordance with embodiments of the present disclosure. A common source of discrepancy between the production data 160 and the test set 145 is the covariate shift. In the covariate shift, changes in the joint distribution of features and labels can be explained solely by changes in the probability of the features. To account for the covariate shift present in the test set 145, sample selection bias correction techniques can be employed.

In the presence of sample selection bias, the empirical distribution of a finite dataset differs from its underlying population distribution (i.e., the test set 145 and the production data 160). A sample selection bias correction technique can be used to correct the bias as demonstrated by Equation 3a and 3b as follows:

$$Pr(s=1|X) = \frac{Pr_{D_t}(X,Y|s=1)Pr(s=1)}{Pr_{D_t}(X,Y)} \quad \text{Equation 3a}$$

$$Pr_{D_t}(X,Y) = Pr_{D_b}(X,Y)\frac{Pr(s=1)}{Pr(s=1|X)} \quad \text{Equation 3b}$$

Let X denote a feature, and Y denote a label. In covariate shift, it can be assumed that the probability of a selection variable s depends on the feature X and not on the label Y, i.e., $Pr(s|X,Y)=Pr(s|X)$. Let $D_t$ be the true distribution over $X \times Y$, and let $D_b$ be a distribution producing a dataset with an inherent covariate shift (selection bias with respect to X). For example, $D_b$ can be represented by the test set 145. Using the selection variable s, this relationship can be expressed as $Pr_{D_b}(X,Y)=Pr_{D_t}(X,Y|s=1)$. Under covariate shift, it can be assumed that $Pr(s=1|X,Y)=Pr(s=1|X)$, the true distribution of $D_t$ can be recovered from the biased demonstrated by Equations 3a and 3b.

Equation 3b gives the relationship between the true and based distributions and identifies the corrective element: a weighting factor given by $$w_i = \frac{Pr(s=1)}{Pr(s=1|X=x_i)} \geq 0$$

which can be found for each instance of $x_i$ where $x_i$ represents a sample within the dataset X. The quantities in the above equation can be estimated from finite samples.

Due to sample selection bias, given a test set 145 and unlabeled production data 160, it is not assumed that the test set 145 is approximate to the production data 160. Equation 3b can be used to correct the sample selection bias. To do so, $Pr(s=1)$ and $Pr(s=1|x=x_i)$ require estimation. It can be estimated that $$Pr(s=1) = \frac{|T|}{|P|}$$

where T represents the test set 145, and P represents the production data 160. To calculate $Pr(s=1|x=x_i)$, the problem domain can be discretized using vector quantization. Vector quantization maps each data vector to a representative codeword. Each of the data vectors can consist of features concatenated with output class probabilities obtained from the output of the base model 110 (e.g., confidence values). To construct codewords, K-means clustering can be applied to the combined test set 145 and the production data 160, producing a set of K cluster centroids (the codewords), where C represents the set of K codewords, $C=\{C_k\}1 \leq k \leq K$.

For structured datasets, K can be equal to the size of a data vector, and for image datasets, K can equal '256' as a baseline number. Given a mapping from feature vectors to their respective centroids, $x_i \rightarrow c_k$, $c_k \in C$, the probability $Pr(s=1|x_i)$ becomes $Pr(s=1|c_k)$ and can be estimated as $$\frac{t_{c_k}}{p_{c_k}}$$

where $t_{c_k}$ and $p_{c_k}$ is the number of times $c_k$ is encountered in the test set 145 and the production data 160, respectively. The weights, used as resampling ratio here, can be obtained using Equation 4 described below:

$$w_i = \frac{|T|/|P|}{t_{c_i}/p_{c_i}} \quad \text{Equation 4}$$

Weights falling below a weight threshold can be reset to zero. This is equivalent to deleting the corresponding (over-represented) sample from the test set. Based on the above weights, the resampling can be performed as an upsampling procedure. For example, all weights are divided by the smallest occurring positive weight and rounded to the closest integer to obtain the new upsampled count. The weight thresholding can also control the upsampling test set size.

The test set adjuster 140 is a component of the performance predictor system 100 configured to add or remove test set samples from the test set 145. In some embodiments, the performance predictor 120 has two outputs. The first output is a binary outcome for labeled samples produced by the base model 110 and a corresponding uncertainty level, or confidence level, which can be its standard deviation. In some embodiments, the standard deviation is used as a proxy for the uncertainty level of the performance predictor 120. As such, the prediction uncertainty offers itself to label prioritization. To add labels, label samples with the highest uncertainty. By doing so, it can be expected to improve the performance predictor's 120 quality in the relevant sample. Similarly, to delete a sample from the test set 145, samples are prioritized with the lowest uncertainty levels. In some embodiments, the added samples are based on a randomized selection. In some embodiments, the removed samples are based on a randomized selection of the test set 145.

The training set 150 is a set of a collection of labeled samples used to train the base model 110 and the performance predictor 120, in accordance with embodiments of the present disclosure. Each sample contains one or more features and a label. For example, the training set 150 may include a collection of photograph examples. Each of the examples may include a label that indicates whether a vehicle is present within the photograph or not. "Features" are input variables of a sample that are used to predict a label. Features can be weighed and adjusted by a model to assist in making an accurate prediction on a label.

In some embodiments, the training set 150 is divided into a training set 150 and a test dataset 145. The test set 145 is a subset of the training set 150 and is used to test the base model 110 after training and validation. The training set 150 can also randomize selecting the training dataset 150 and the test dataset 145 selections to prevent overfitting by the base model 110.

Production data 160 is data received during the production process of the base model 110, in accordance with embodiments of the present disclosure. Once deployed, a base model 110 can make predictions on the production data 160 based on the requirements set forth for the base model 110.

It is noted that FIG. 1 is intended to depict the major representative components of a performance predictor system 100. In some embodiments, however, individual components may have greater or lesser complexity than as represented in FIG. 1, components other than or in addition to those shown in FIG. 1 may be present, and the number, type, and configuration of such components may vary.

Figure 2:
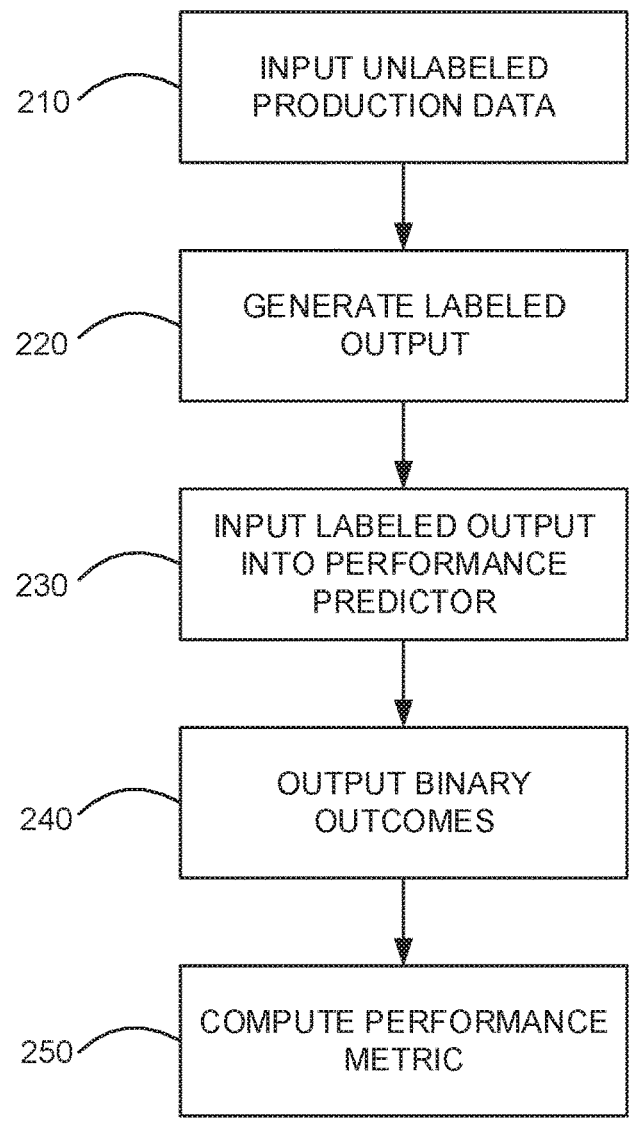
FIG. 2 is a flow chart of a performance predictor process, in accordance with embodiments of the present disclosure.

FIG. 2 is a flow diagram illustrating a process 200 for performing a performance predictor process, in accordance with embodiments of the present disclosure. The process 300 may be performed by hardware, firmware, software executing on at least one processor, or any combination thereof. For example, any or all of the steps of the process 300 may be performed by one or more computing devices (e.g., computer system 600 of FIG. 6). To illustrate process 200, but not to limit embodiments, FIG. 2 is described within the context of the performance predictor system 100 of FIG. 1.

The process 200 begins by inputting unlabeled production data 160 into the base model 110. This is illustrated at step 210. The unlabeled production data can be inputted in batches based on the requirements designated to the base model 110. For example, a batch of production data 160 can be the amount of production data 160 received by the performance predictor system 100 over a predetermined period of time. The predetermined period of time can be based on the amount of traffic that is received by the performance predictor system 100. For example, if the traffic is slow, a longer predetermined period of time may be set, and vice versa, if there is a lot of traffic going into the performance predictor system 100, then the predetermined period of time may be short.

The base model 110 generates a labeled output for each sample within the inputted production data 160. This is illustrated at step 220. The labeled output includes a group of data samples, or samples, that have been tagged with one or more labels. A label can typically include one or more meaningful tags that are informative regarding the sample. For example, labels might indicate that a photograph contains a vehicle on a roadway, next to a stop sign. In another example, a sample may be an audio recording with labels that indicate what words are spoken in the recording.

The labeled output is inputted into the performance predictor for analysis. This is illustrated at step 230. Similar to the production data 160, the labeled output can be inputted in batches. For example, the base model 110 can generate a batch of labeled output from the batch of production data taken over a predetermined period of time. In some embodiments, when a labeled sample is outputted by the base model 110, it is then inputted into the performance predictor 120 to be evaluated.

The performance predictor 120 outputs a binary outcome for each labeled sample inputted. This is illustrated at step 240. The binary outcomes can indicate whether the base model 110 correctly labeled the sample, or whether the base model 110 incorrectly labeled the sample. In some embodiments, the performance predictor 120 produces an uncertainty level in conjunction with the binary outcome. The uncertainty level indicates the amount of uncertainty the performance predictor 120 has regarding the corresponding binary outcome.

A performance metric is calculated based on the binary outcomes of the batch inputted into the performance predictor 120. This is illustrated at step 250. The performance metric used can be based on the type of base model 110 being used in production. The performance metric can be represented as accuracy, precision, recall, error rate, ranking loss, and the like. For example, a base model 110 used to distinguish between images of different objects can use a performance metric such as log-loss, average accuracy, or area under curve (AUC). If the base model 110 is predicting stock prices, then the performance metric can be rot mean squared error (RMSE) can be used. Different performance metrics can be calculated to measure the efficiency of different algorithms used by a base model 110.

Figure 3:
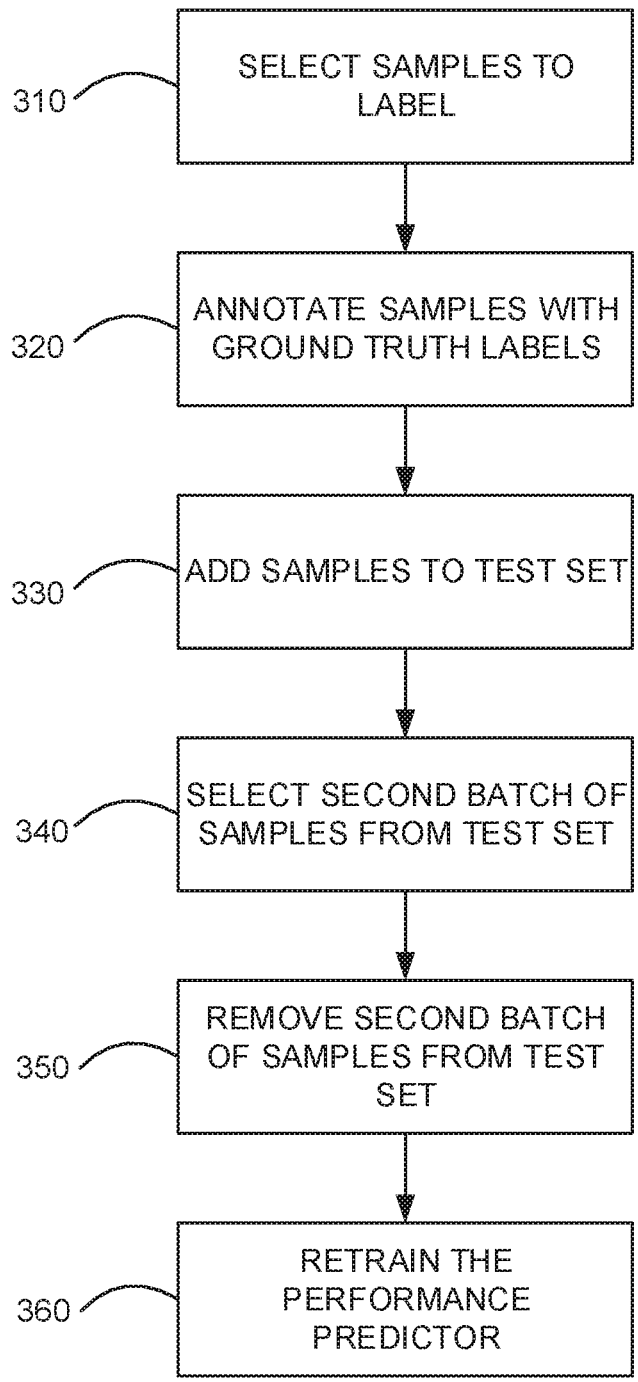
FIG. 3 is a flow chart of a test set adjustment process, in accordance with embodiments of the present disclosure.

FIG. 3 is a flow diagram illustrating process 300 of a test set adjustment process 300, in accordance with embodiments of the present disclosure. The process 300 may be performed by hardware, firmware, software executing on at least one processor, or any combination thereof. For example, any or all of the steps of the process 300 may be performed by one or more computing devices (e.g., computer system 600 of FIG. 6). To illustrate process 300, but not to limit embodiments, FIG. 3 is described within the context of the performance predictor system 100 of FIG. 1.

Samples are selected from the production data 160 to be labeled. This is illustrated at step 310. In some embodiments, the samples are selected randomly from samples in the production data 160. The number of samples selected to be labeled can be based on a predetermined budget. If a budget only allows for ten samples to be labeled, then only ten samples are selected.

Once selected, the samples are annotated with ground truth labels. This is illustrated at step 320. Ground truth refers to an ideal expected result. The annotation process applies ground truth labels to the unlabeled samples. Annotating can be accomplished through various means. For example, annotation can occur automatically from payload data, from specialized annotation companies, and from individuals contracted over the internet.

Depending on the budget available, organizations, or individuals, can rely on various sources to perform the annotation process. For example, annotations can be performed by undergraduate or graduate students, crowdsourcing services, or directly from user inputs, otherwise known as payload data. However, these sources can provide incorrect or biased labeled data if that data is not inspected and pre-processed correctly. Once annotated, the labeled samples are added to the test set 145. This is illustrated at step 330.

A second batch of samples is selected from the test set. This is illustrated at step 350. In some embodiments, the samples are selected randomly from samples in the test set 145. The number of samples selected to be labeled can be based on the samples added. If a budget only allows for ten samples to be labeled, then only ten samples are selected. Once selected, the second batch of samples are removed from the test set. This is illustrated at step 350. By removing the same number of samples as are added, the test set remains the size.

The performance predictor 120 is retrained with the updated test set 145. This is illustrated at step 360. Training the performance predictor 120 allows it to converge to the true accuracy of the trained base model 110 on the production data 160.

Figure 4:
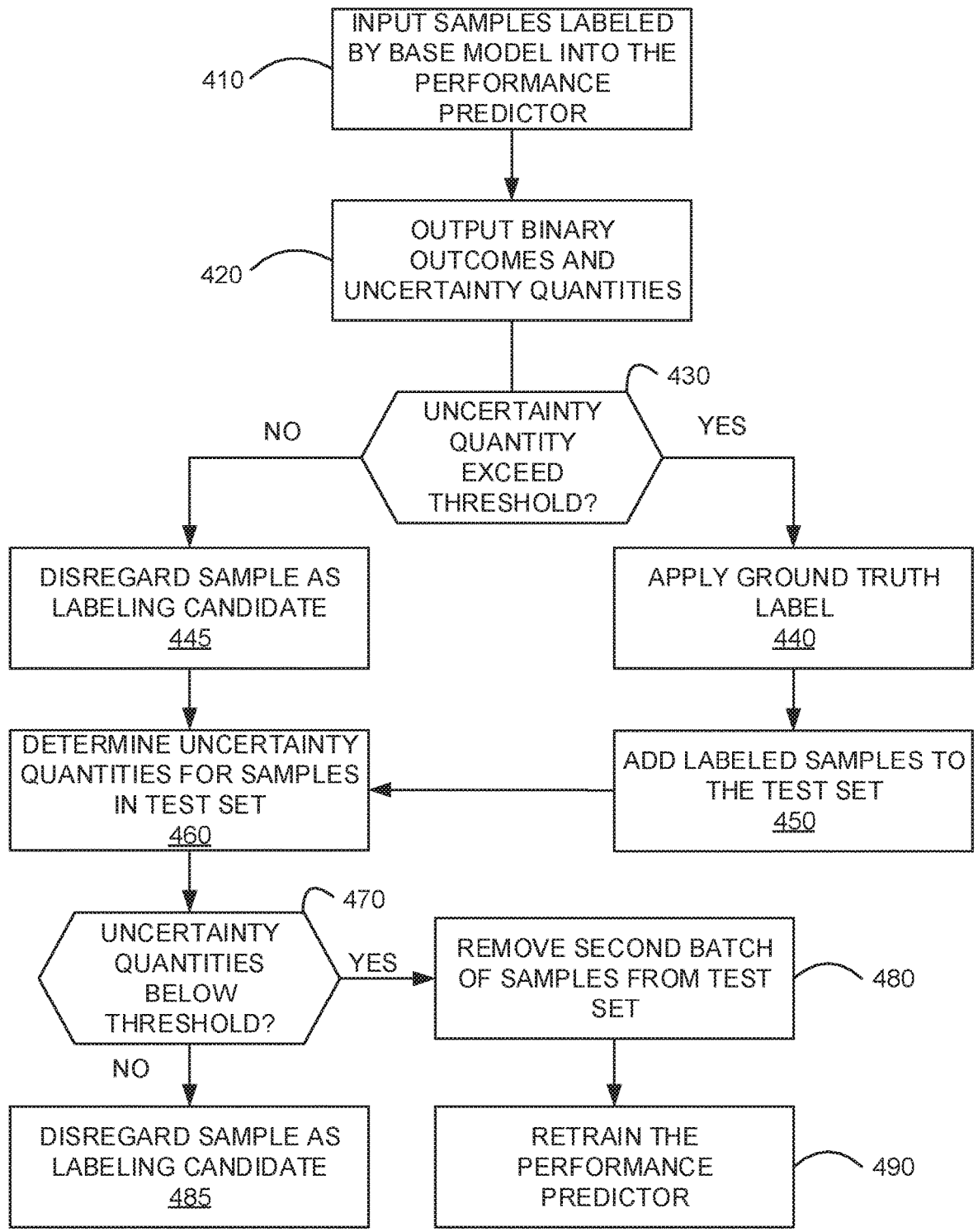
FIG. 4 is a flow chart of a prioritized test set adjustment process, in accordance with embodiments of the present disclosure.

FIG. 4 is a flow diagram illustrating a process 400 of a prioritized test set adjustment process, in accordance with embodiments of the present disclosure. The process 400 may be performed by hardware, firmware, software executing on at least one processor, or any combination thereof. For example, any or all of the steps of the process 400 may be performed by one or more computing devices (e.g., computer system 600 of FIG. 6). To illustrate process 400, but not to limit embodiments, FIG. 4 is described within the context of the performance predictor system 100 of FIG. 1.

The process 400 begins by inputting samples labeled by the base model 110 into the performance predictor 120. This is illustrated at step 410. The labeled samples can be inputted individually as they are outputted by the base model 110 or in batches based on the requirements designated to the base model 110. For example, a batch of production data 160 can be the amount of production data 160 received by the performance predictor system 100 over a predetermined period of time. Once the batch is labeled by the base model 110, it can then be inputted into the performance predictor 120.

The performance predictor 120 outputs a binary outcome for each labeled sample inputted. This is illustrated at step 420. The binary outcomes can indicate whether the base model 110 correctly labeled the sample, or whether the base model 110 incorrectly labeled the sample. Additionally, the performance predictor 120 produces an uncertainty quantity in conjunction with the binary outcome. The uncertainty quantity can indicate the amount of uncertainty the performance predictor 120 has in regard to the corresponding binary outcome.

The uncertainty quantities are analyzed to determine which samples exceed a predetermined uncertainty threshold. This is illustrated at step 430. Samples that exceed a predetermined threshold may indicate that those samples are under-represented in the test set. For example, a predetermined uncertainty threshold may be set for twenty percent. If the uncertainty quantity exceeds twenty percent, then that sample may be considered as an under-represented sample and can be considered a candidate for ground truth labeling. However, if the label does not exceed an uncertainty threshold, then that sample can be disregarded as a candidate for ground truth labeling. This is illustrated at step 445.

Samples with uncertainty quantities that exceed a predetermined uncertainty threshold are annotated with ground truth labels. This is illustrated at step 440. Similar to step 320 of FIG. 3, the annotation process applies ground truth labels to the unlabeled samples. Annotating can be accomplished through various means. For example, annotation can occur automatically from payload data, from specialized annotation companies, and individuals contracted over the internet. Once annotated, the labeled samples are added to the test set 145. This is illustrated at step 450.

The performance predictor 120 determines the uncertainty quantity for the samples in the test set 145. This is illustrated at step 460. The uncertainty quantities are analyzed to determine which samples are below a second predetermined uncertainty threshold. This is illustrated at step 470. Samples below a second predetermined threshold may indicate that those samples are under-represented in the test set. For example, a predetermined uncertainty threshold may be set for ninety percent. If the uncertainty quantity is below ninety percent, then that sample may be considered as an over-represented sample and can be considered a candidate for removal from the test set. However, if the label is not below the second uncertainty threshold, then that sample can be disregarded as a candidate for removal. This is illustrated at step 485.

The samples with uncertainty quantities below a second uncertainty threshold are removed from the test set. This is illustrated at step 480. Removing the samples based on their uncertainty quantity can be viewed as a form of prioritized selection. The number of samples removed can also be based on the samples added. If a budget only allows for ten samples to be labeled, then only ten samples are selected.

The performance predictor 120 is retrained with the updated test set 145. This is illustrated at step 490. Training the performance predictor 120 allows it to converge to the true accuracy of the trained base model 110 on the production data 160.

Figure 5:
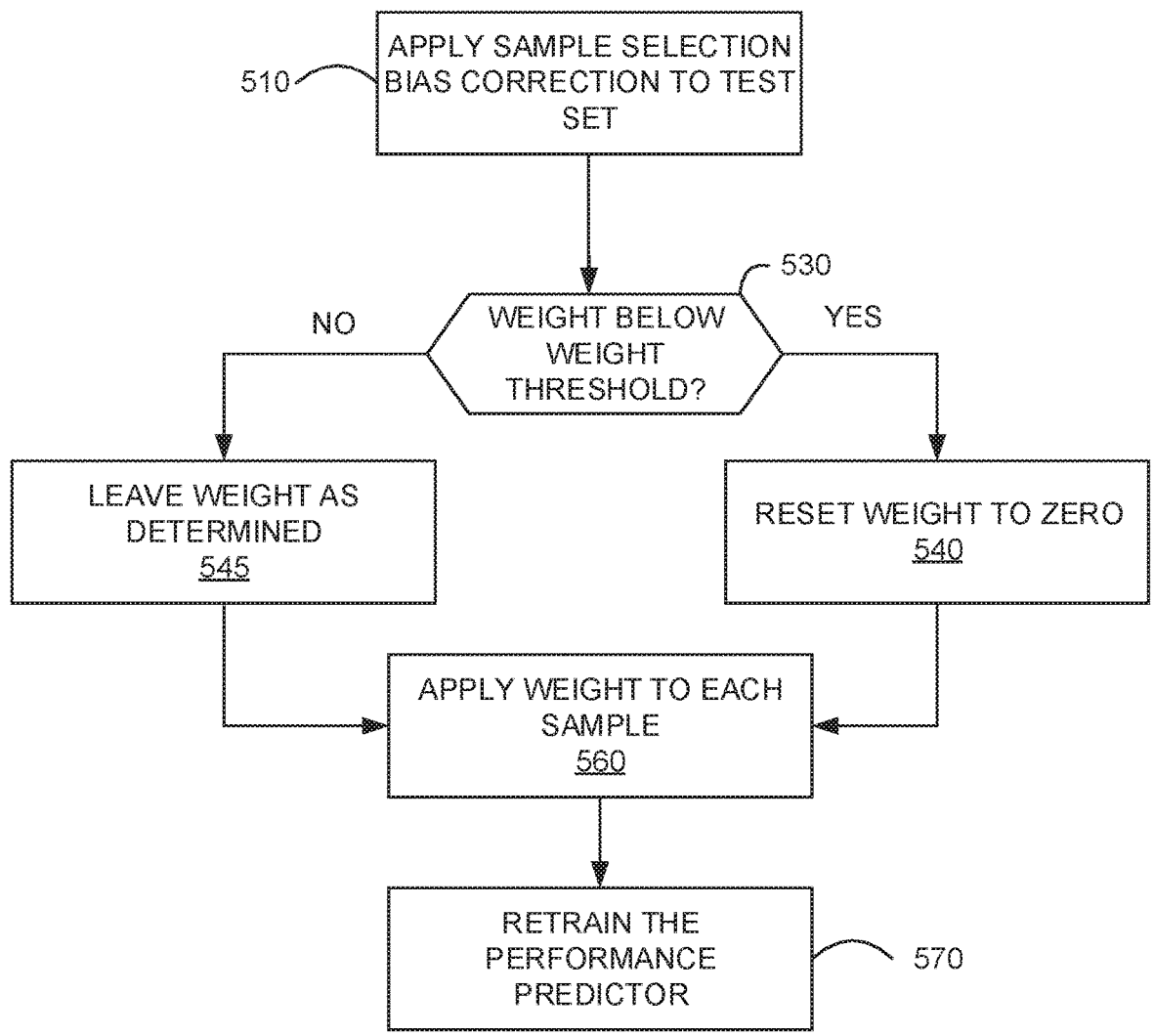
FIG. 5 is a flow chart of a test set resampling process, in accordance with embodiments of the present disclosure.

FIG. 5 is a flow diagram illustrating a process 500 of a test set resampling process, in accordance with embodiments of the present disclosure. The process 400 may be performed by hardware, firmware, software executing on at least one processor, or any combination thereof. For example, any or all of the steps of the process 500 may be performed by one or more computing devices (e.g., computer system 600 of FIG. 6). To illustrate process 500, but not to limit embodiments, FIG. 5 is described within the context of the performance predictor system 100 of FIG. 1.

Process 500 begins by applying a sample selection bias correction technique to the test set 145. This is illustrated at step 510. The sample selection bias correction technique includes reweighting the cost of an error on each test set sample so that the sample more closely reflects the unbiased distribution of the production data 160. In some embodiments, the sample selection bias correction techniques utilize Equations 3a and 3b including Equation 4 as the weighting equation. In some embodiments, a point-based stability technique is used as the sample selection bias correction technique.

The weights for each sample are evaluated that is produced by the sample selection bias correction technique. This is illustrated at step 530. If the weights are not below a predetermined weight threshold, then the weighted sample is not altered. This is illustrated at step 545. However, if the weights are below a predetermined weight threshold, then the weight is reset to zero. This is illustrated at step 540. For example, if the predetermined weight threshold is set to five, then any weight below five would be reset to zero. By resetting the weight to zero, it effectively removes the sample from the test set as that sample would not have a factor in testing.

The weights determined by the sample selection bias correction technique are applied to their corresponding samples. This is illustrated at step 560. For example, if the sample is determined to have a weighting factor of seven, then seven is applied to the sample as a weighting factor. Once applied, the performance predictor 120 is retrained with the updated test set 145. This is illustrated at step 570.

Figure 6:
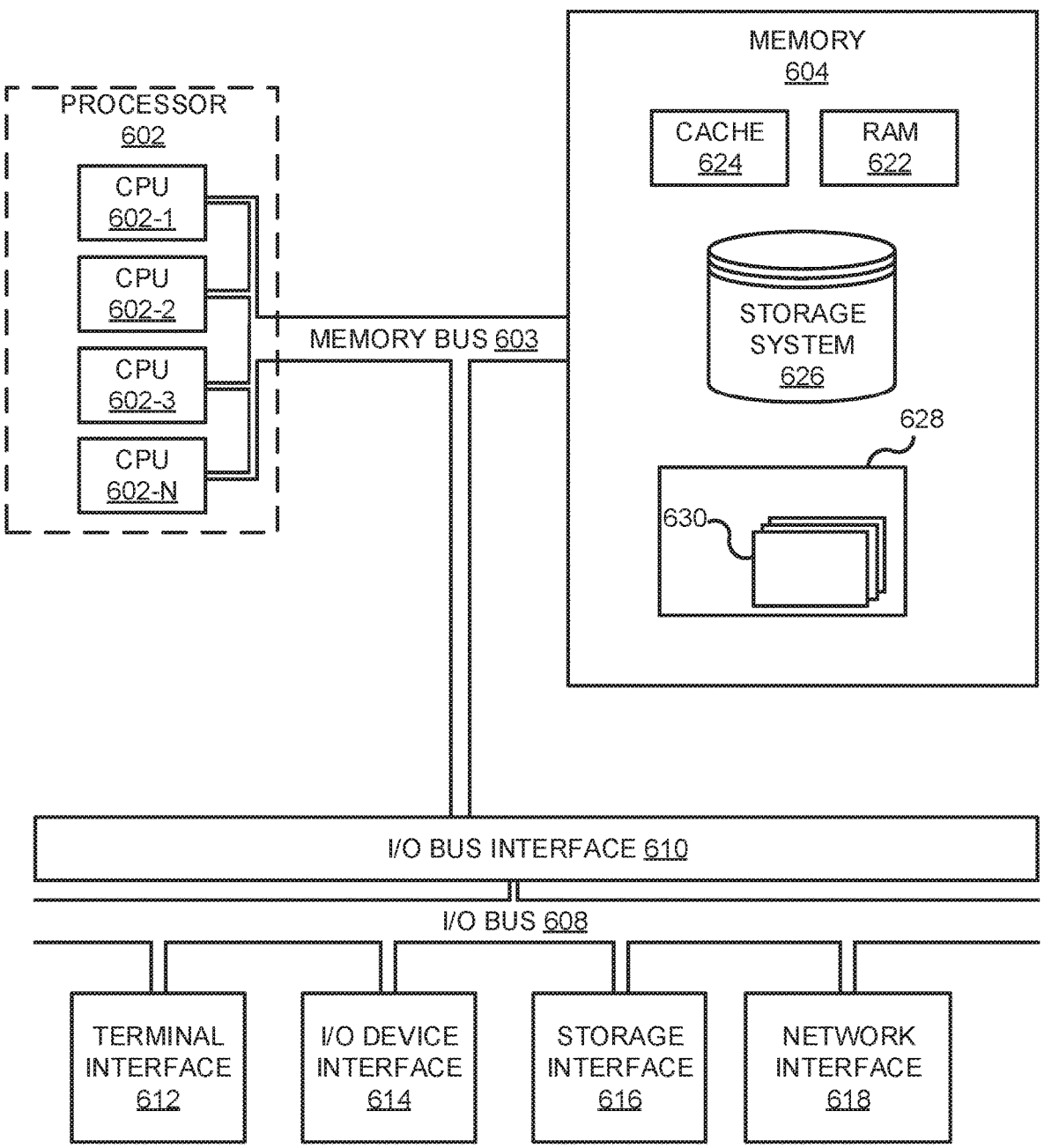
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 600 (e.g., the performance predictor system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 601 may execute instructions stored in the memory 604 and may include one or more levels of on-board cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. Also, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
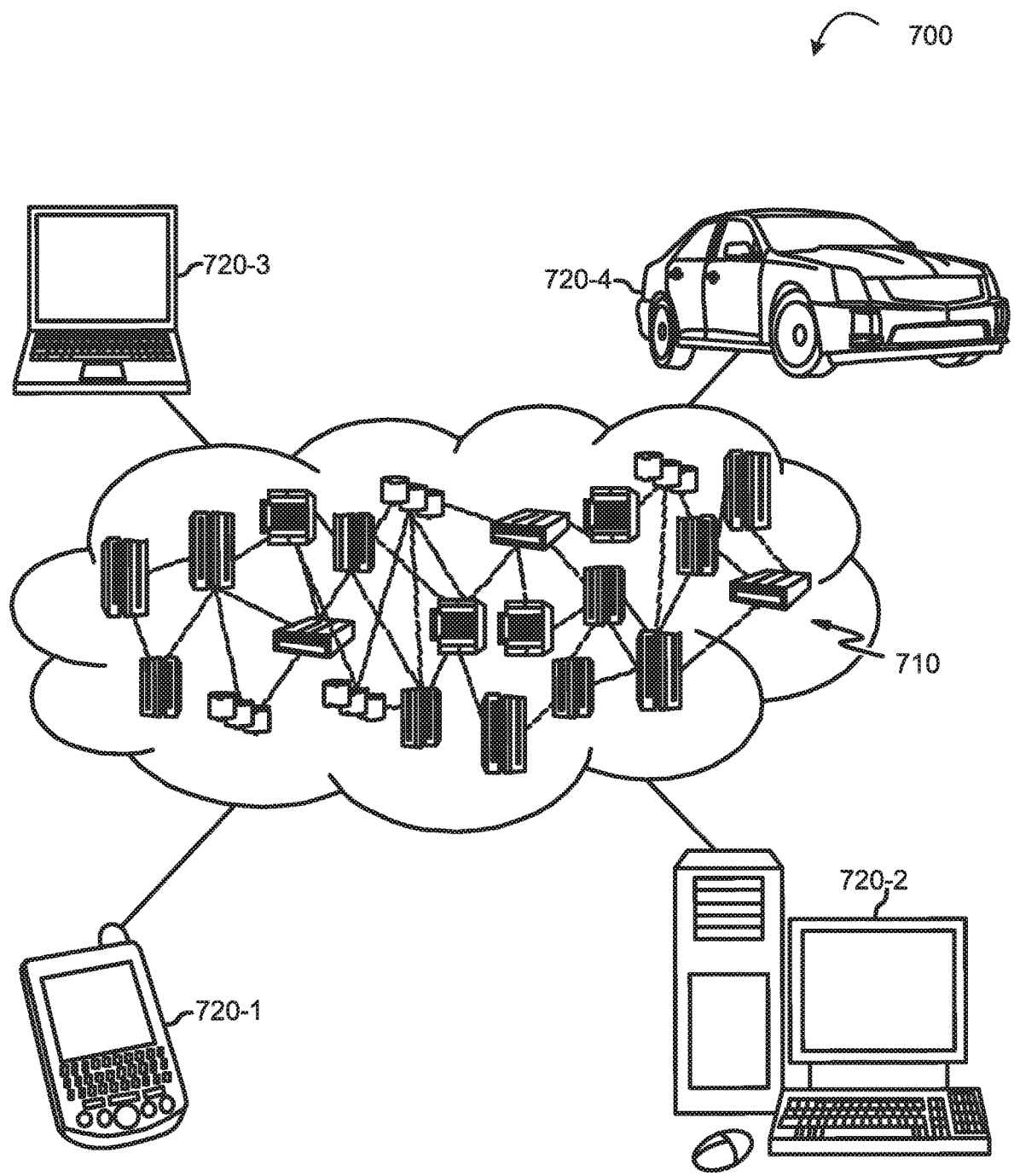
FIG. 7 depicts a cloud computing environment, in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
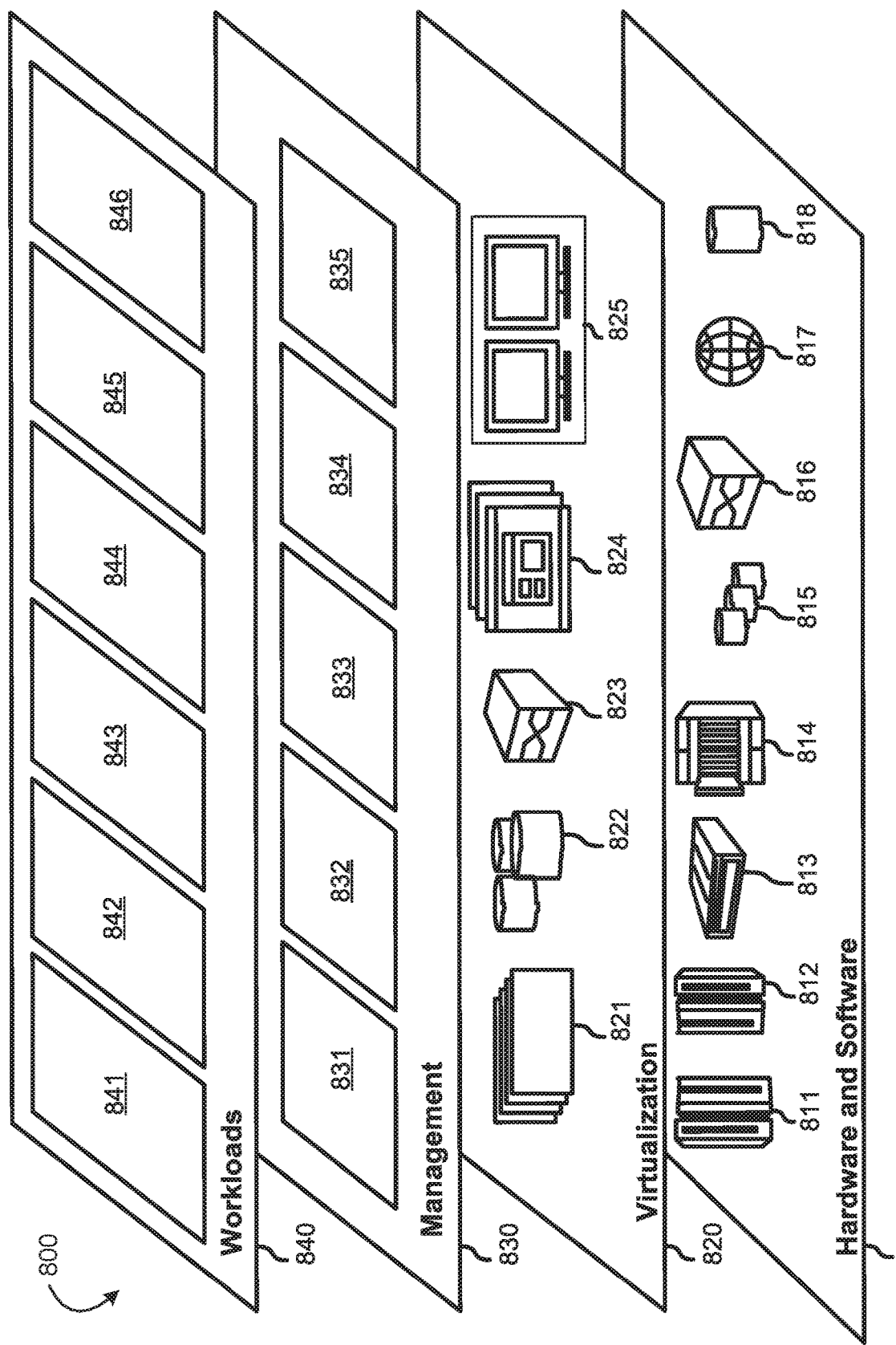
FIG. 8 depicts abstraction model layers, in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include mapping and navigation 841; software development and lifecycle management 842 (e.g., the performance predictor system 100); virtual classroom education delivery 843; data analytics processing 844; transaction processing 845; and precision cohort analytics 846.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing labeled sample quantities required to update test sets, the computer-implemented method comprising:
inputting a labeled output relating to a portion of unlabeled production data into a performance predictor, wherein the performance predictor is a meta model trained with another portion of the unlabeled production data, a training set used to train a base model, and a test set portioned from the training set;

outputting, by the performance predictor, binary outcomes relating to the labeled output produced by the trained base model, the binary outcomes indicating whether the base model selected a correct label; and computing a performance metric for the labeled output by analyzing the binary outcomes for each sample in the labeled output.

2. The computer-implemented method of claim 1, further comprising:

selecting a batch of samples from the unlabeled production data via random selection;

applying ground truth labels to the batch of samples;

adding the batch of samples with ground truth labels to the test set; and retraining the performance predictor with the test set.

3. The computer-implemented method of claim 2, further comprising:

selecting a second batch of samples from the test set via random selection; and removing, prior to retraining the performance predictor, the second batch of samples from the test set.

4. The computer-implemented method of claim 1, further comprising:

inputting a batch of samples labeled by the base model into the performance predictor;

outputting, by the performance predictor, test binary outcomes and uncertainty quantities indicating an amount of uncertainty the performance predictor has for each of the test binary outcomes;

applying ground truth labels to the samples with the uncertainty quantities exceeding an uncertainty threshold;

adding the labeled samples to the test set; and retraining the performance predictor with the test set.

5. The computer-implemented method of claim 4, further comprising:

selecting a second batch of samples from the test set selected by a prioritized selection of samples within the test set, wherein the prioritized selection includes selecting the samples with the uncertainty quantities below a second uncertainty threshold; and removing, prior to retraining the performance predictor, the second batch of samples from the test set.

6. The computer-implemented method of claim 1, further comprising:

applying a sample selection bias correction technique to the test set;

determining weights for each sample in the test set;

resetting the weights falling below a weight threshold to zero;

applying the weights to each of the samples in the test set; and retraining the performance predictor with the test set.

7. The computer-implemented method of claim 6, further comprising:

inputting a batch of samples labeled by the base model into the performance predictor;

outputting, by the performance predictor, test binary outcomes and uncertainty quantities indicating an amount of uncertainty the performance predictor has for each of the test binary outcomes;

applying ground truth labels to the samples with the uncertainty quantities exceeding an uncertainty threshold;

adding the labeled samples to the test set;

retraining the performance predictor with the test set;

selecting a second batch of samples from the test set selected by a prioritized selection of samples within the test set, wherein the prioritized selection includes selecting the samples with the uncertainty quantities below a second uncertainty threshold; and removing, prior to retraining the performance predictor, the second batch of samples from the test set;

inputting a second portion of unlabeled production data into the base model;

generating, by the base model, additional labeled output relating to the unlabeled production data;

inputting the additional labeled output into a performance predictor; and outputting, by the performance predictor, a second performance metric relating to the labeled output produced by the trained base model.

8. The computer-implemented method of claim 1, wherein the performance metric is a measurement of an accuracy relating to the base model.

9. A computer program product comprising a computer-readable storage medium having program instructions embodied therewith, the program instructions executable by a processor to cause the processor to perform a method comprising:

inputting a portion of unlabeled production data into a base model;

generating, by the base model, labeled output relating to the unlabeled production data;

inputting the labeled output into a performance predictor, wherein the performance predictor is a meta model trained with another portion of the unlabeled production data, a training set used to train the base model, and a test set portioned from the training set;

outputting, by the performance predictor, binary outcomes relating to the labeled output produced by the trained base model, the binary outcomes indicating whether the base model selected a correct label; and computing a performance metric for the labeled output by analyzing the binary outcomes for each sample in the labeled output.

10. The computer program product of claim 9, further comprising:

selecting a batch of samples from the unlabeled production data via random selection;

applying ground truth labels to the batch of samples;

adding the batch of samples with ground truth labels to the test set; and retraining the performance predictor with the test set.

11. The computer program product of claim 10, further comprising:

selecting a second batch of samples from the test set via random selection; and removing, prior to retraining the performance predictor, the second batch of samples from the test set.

12. The computer program product of claim 9, further comprising:

inputting a batch of samples labeled by the base model into the performance predictor;

outputting, by the performance predictor, test binary outcomes and uncertainty quantities indicating an amount of uncertainty the performance predictor has for each of the test binary outcomes;

applying ground truth labels to the samples with the uncertainty quantities exceeding an uncertainty threshold;

adding the labeled samples to the test set; and retraining the performance predictor with the test set.

13. The computer program product of claim 12, further comprising:
- selecting a second batch of samples from the test set selected by a prioritized selection of samples within the test set, wherein the prioritized selection includes selecting the samples with the uncertainty quantities below a second uncertainty threshold; and
- removing, prior to retraining the performance predictor, the second batch of samples from the test set.

14. The computer program product of claim 9, further comprising:
- applying a sample selection bias correction technique to the test set;
- determining weights for each sample in the test set;
- resetting the weights falling below a weight threshold to zero;
- applying the weights to each of the samples in the test set; and
- retraining the performance predictor with the test set.

15. The computer program product of claim 14, further comprising:
- inputting a batch of samples labeled by the base model into the performance predictor;
- outputting, by the performance predictor, test binary outcomes and uncertainty quantities indicating an amount of uncertainty the performance predictor has for each of the test binary outcomes;
- applying ground truth labels to the samples with the uncertainty quantities exceeding an uncertainty threshold;
- adding the labeled samples to the test set;
- retraining the performance predictor with the test set;
- selecting a second batch of samples from the test set selected by a prioritized selection of samples within the test set, wherein the prioritized selection includes selecting the samples with the uncertainty quantities below a second uncertainty threshold; and
- removing, prior to retraining the performance predictor, the second batch of samples from the test set;
- inputting a second portion of unlabeled production data into the base model;
- generating, by the base model, additional labeled output relating to the unlabeled production data;
- inputting the additional labeled output into a performance predictor; and
- outputting, by the performance predictor, a second performance metric relating to the labeled output produced by the trained base model.

16. The computer program product of claim 9, wherein the performance metric is a measurement of an accuracy relating to the trained base model.

17. A computer system for reducing labeled sample quantities required to update test sets, the computer system comprising:
- a data processing component;
- a physical memory; and
- local data storage having stored thereon computer executable program code, which when executed by the data processing component causes the data processing component to:
  - inputting a portion of unlabeled production data into a base model;
  - generating, by the base model, labeled output relating to the unlabeled production data;
  - inputting the labeled output into a performance predictor, wherein the performance predictor is a meta model trained with another portion of the unlabeled production data, a training set used to train the base model, and a test set portioned from the training set;
  - outputting, by the performance predictor, binary outcomes relating to the labeled output produced by the trained base model, the binary outcomes indicating whether the base model selected a correct label; and
  - computing a performance metric for the labeled output by analyzing the binary outcomes for each sample in the labeled output.

18. The computer system of claim 17, further comprising:
- inputting a batch of samples labeled by the base model into the performance predictor;
- outputting, by the performance predictor, test binary outcomes and uncertainty quantities indicating an amount of uncertainty the performance predictor has for each of the test binary outcomes;
- applying ground truth labels to the samples with the uncertainty quantities exceeding an uncertainty threshold;
- adding the labeled samples to the test set; and
- retraining the performance predictor with the test set.

19. The computer system of claim 18, further comprising:
- applying a sample selection bias correction technique to the test set;
- determining weights for each sample in the test set;
- resetting the weights falling below a weight threshold to zero;
- applying the weights to each of the samples in the test set; and
- retraining the performance predictor with the test set.

20. The computer system of claim 19, further comprising:
- inputting a batch of samples labeled by the base model into the performance predictor;
- outputting, by the performance predictor, test binary outcomes and uncertainty quantities indicating an amount of uncertainty the performance predictor has for each of the test binary outcomes;
- applying ground truth labels to the samples with the uncertainty quantities exceeding an uncertainty threshold;
- adding the labeled samples to the test set;
- retraining the performance predictor with the test set;
- selecting a second batch of samples from the test set selected by a prioritized selection of samples within the test set, wherein the prioritized selection includes selecting the samples with the uncertainty quantities below a second uncertainty threshold; and
- removing, prior to retraining the performance predictor, the second batch of samples from the test set;
- inputting a second portion of unlabeled production data into the base model;
- generating, by the base model, additional labeled output relating to the unlabeled production data;
- inputting the additional labeled output into a performance predictor; and
- outputting, by the performance predictor, a second performance metric relating to the labeled output produced by the trained base model.

* * * * *